United States Patent [19]
Hassan

[11] Patent Number: 6,031,826
[45] Date of Patent: Feb. 29, 2000

[54] FAST ASSOCIATED CONTROL CHANNEL TECHNIQUE FOR SATELLITE COMMUNICATIONS

[75] Inventor: Amer A. Hassan, Cary, N.C.

[73] Assignee: Ericsson Inc., Research Triangle Park, N.C.

[21] Appl. No.: 08/697,598

[22] Filed: Aug. 27, 1996

[51] Int. Cl.⁷ ............................... H04B 7/212; H04Q 7/22
[52] U.S. Cl. ........................ 370/321; 370/523; 370/528; 455/553; 455/522
[58] Field of Search ...................... 370/528, 523, 370/468, 318, 321, 337, 342, 347, 456, 478, 498; 455/553, 522, 69; 371/31

[56] References Cited

U.S. PATENT DOCUMENTS

| | | | |
|---|---|---|---|
| 5,199,031 | 2/1991 | Dahlin | 370/513 |
| 5,267,262 | 11/1993 | Wheatley, III | 455/522 |
| 5,357,513 | 10/1994 | Kay et al. | 455/69 |
| 5,398,247 | 3/1993 | Delprat et al. | 370/347 |
| 5,491,719 | 7/1993 | Sellin et al. | 371/31 |
| 5,491,837 | 2/1996 | Haartsen | 455/522 |
| 5,546,464 | 9/1994 | Raith et al. | 380/48 |
| 5,564,077 | 2/1993 | Obayashi et al. | 455/553 |
| 5,604,744 | 10/1994 | Andersson et al. | 370/347 |
| 5,661,724 | 12/1995 | Chennakeshu et al. | 370/324 |
| 5,663,957 | 7/1995 | Dent | 370/347 |
| 5,712,868 | 1/1998 | Stern et al. | |

FOREIGN PATENT DOCUMENTS

| | | |
|---|---|---|
| 0 619 664A2 | 10/1994 | European Pat. Off. . |
| 0651523 | 10/1994 | European Pat. Off. .......... H04B 7/26 |
| 0 637 180A1 | 2/1995 | European Pat. Off. . |
| 0 671 824A1 | 3/1995 | European Pat. Off. . |
| 0675605 | 3/1995 | European Pat. Off. .......... H04B 1/40 |
| 0 651 523 | 5/1995 | European Pat. Off. .......... H04B 7/26 |
| 0 651 523A2 | 5/1995 | European Pat. Off. . |
| 0 675 605 | 10/1995 | European Pat. Off. .......... H04B 1/40 |
| 0 690 590A1 | 1/1996 | European Pat. Off. . |
| 0 717 508 | 6/1996 | European Pat. Off. ........ H04B 7/005 |
| 2 693 060 | 12/1993 | France ............... H04L 5/00 |
| 2 259 633 | 3/1993 | United Kingdom .......... H03M 13/12 |

Primary Examiner—Chi H. Pham
Assistant Examiner—Steven Nguyen
Attorney, Agent, or Firm—Burns, Doane, Swecker & Mathis, L.L.P.

[57] ABSTRACT

A method and system for transmitting control information, such as Fast Associated Control Channel (FACCH) information in a digital TDMA communication system. Control information, when required, is transmitted over every other TDMA frame, and speech and data are transmitted over the remaining TDMA frames. Coding protection is reduced during transmission of the control information.

24 Claims, 4 Drawing Sheets

FAST ASSOCIATED CONTROL CHANNEL TECHNIQUE FOR SATELLITE COMMUNICATIONS

FIELD OF THE INVENTION

The present invention relates to the transmission of control channel information in a telecommunications system, and in particular to a method for transmitting fast associated control channel (FACCH) information by reducing speech error protection during the fast associated control channel transmission.

BACKGROUND OF THE INVENTION

The GSM standard (Global System for Mobile Communication) is a widely deployed wireless cellular telephone standard using digital speech transmission. It has been adapted to provide wireless communication for geostationary circular orbit satellite systems as well as for terrestrial cellular networks. Signals within the system are transmitted using Time Division Multiple Access (TDMA) frames and superframes. A superframe structure in the GSM "full rate" format in a terrestrial system consists of 4×26 TDMA frames as illustrated in FIG. 1. In each row, frames 1–12 and 14–25 each contain eight traffic timeslots. Since neighboring base stations in a GSM system are not required to be synchronized, a complete frame (frame 13 in FIG. 1) is left idle to guarantee that the mobile can capture and decode a broadcast control channel (BCCH) signal burst from a neighboring base station regardless of the frame time offset between the base stations.

Speech and information data (such as fax or computer data) are not the only information communicated during a phone call. In satellite and terminated systems, control signals are typically exchanged between a control station (base station or satellite) and a mobile phone during a telephone conversation. The control signals allow the mobile phone and the network to monitor and control the communication link. When a call is in progress, GSM provides control channels to communicate control information between a mobile unit and its associated network. Each traffic channel is associated with a slow associated control channel (SACCH), which typically carries about two messages per second in each direction with a transmission delay of approximately 0.5 seconds plus propagation delay. The SACCH channel typically communicates non-urgent information such as measurement data used for handoff decisions. In FIG. 1, every 26th frame in the superframe structure contains SACCH information. Each SACCH message is interleaved over 4 SACCH bursts in each superframe. Each SACCH frame comprises 8 timeslots allowing one unique SACCH channel or each mobile link.

A second control channel for communicating control messages to and from a mobile phone during a telephone conversation uses the traffic channel. This control channel is called the fast associated control channel (FACCH) and carries urgent messages such as a handoff command where the base station instructs the mobile phone to switch to another frequency or timeslot. The fast associated control channel can also be used to authenticate a subscriber.

Each mobile unit is assigned a logical channel consisting of a particular one out of the 8 timeslots in each TDMA frame used for traffic information. According to the GSM standard, speech frames are generated every 20 milliseconds by a speech coder. With a speech coding rate of 13 Kbps, this corresponds to 260 bits per 20 millisecond speech frame. The speech bits are coded up to 456 bits. These 456 bits are divided into 8 groups of 57 bits each. Then, the 57 bits of one speech frame are interleaved with 57 bits of another speech frame. To these 114 bits, a 26 bit sync word, two 1 bit FACCH (fast associated control channel) flags, two sets of 3 tail bits and 8.25 bits to accommodate up/down ramping and guard time are added to form a TDMA slot comprising 156.25 bits. Each 20 mS block of coded data representing a segment of the speech waveform is spread over eight consecutive TDMA frames in a process known as block diagonal interleaving. Each eight frame interleaved block is half overlapped and merged with 4 frames of each of the adjacent speech blocks in order to fill each timeslot with bits that have come half from one speech frame and half from another speech frame. Each TDMA frame is then transmitted on a different frequency using frequency hopping to obtain the benefit known as interference averaging or interferer diversity.

The format of each GSM burst is illustrated in FIG. 2. An 8.25-bit guard and up/down ramping time is left between each burst. The up/down ramping of one burst may overlap with that of the adjacent burst but may not overlap with its other bits. The up/down ramping on the uplink (mobile) transmission is usually 4.25 bit periods, leaving a 4 bit period margin for time alignment errors between different mobile bursts as received at the base station. The base station sends SACCH commands to advance or retard mobile unit transmission timing to accomplish this function. GSM base stations have a fixed transmission timing and hence can use the whole 8.25 bit periods for up/down ramping.

The 3 tail bits allow the impulse response to the channel and modulation filter to terminate within the burst, and ensure that the end bits are demodulated with the same error probability as bits in the middle of the burst.

The flag bits on either side of a sync word indicate whether the previous or current 20 millisecond speech frame contains speech or FACCH information. One complete 20 millisecond speech frame has 8 associated flag bits in total, allowing the receiver to reliably decide whether the frame contains speech or FACCH information.

The sync word is a known bit pattern used to determine the characteristics of the transmission channel and to enhance demodulation. The sync word of 26 bits allows determination of five coefficients of a symbol-spaced, 5-tap model of the composite channel impulse response comprising transmit and receive filtering and physical channel. This allows each burst to be demodulated with no additional information from previous bursts. Because the characteristics of a physical channel are dynamic, the sync word is ideally located in the middle of the burst so that channel changes are less likely to affect the sync word than the information bits.

During FACCH transmission in conventional systems, speech or information data frames are not transmitted by the base station. That is, speech frames are "stolen" and replaced by the FACCH information. If the speech interruption is on the order of 40 milliseconds (i.e., a relatively short FACCH message), a user is unlikely to notice the missing speech frame(s). However, for longer delays (i.e., relatively lengthy FACCH messages), the degradation due to speech replacement becomes noticeable. It would be desirable to transmit FACCH information, including relatively lengthy FACCH messages, without noticeable degradation.

SUMMARY OF THE INVENTION

To overcome the above-described problems with the prior art, the present invention provides a method in which speech error protection is reduced during the transmission of control (e.g., FACCH) information. According to the present invention, when FACCH information is needed, speech information is sent using some portion (e.g., every other one) of the TDMA frames while the FACCH message is sent using the remaining frames. The coding protection is preferably reduced during transmission of the FACCH data. The information from the speech frames can be combined to reconstruct the transmitted speech information. Similarly, the FACCH control message can be reconstructed by combining the remaining frames. The method of the present invention allows control information, including relatively lengthy FACCH messages, to be transmitted without noticeable speech degradation, and is particularly effective in systems which have air interfaces with two possible modes of operation.

BRIEF DESCRIPTION OF THE DRAWINGS

These and other features and advantages of the present invention will be readily apparent to one of ordinary skill in the art upon reading the following written description, in conjunction with the attached drawings, in which.

DETAILED DESCRIPTION OF THE PREFERRED EMBODIMENTS

Figure 1:
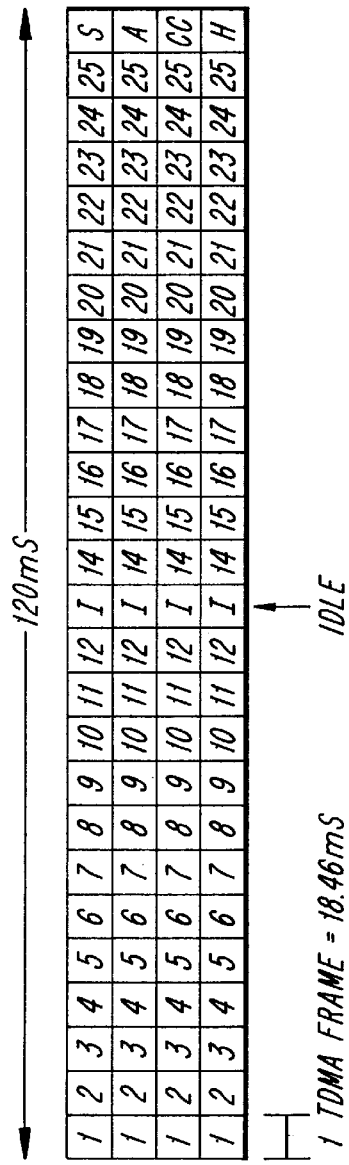
FIG. 1 illustrates a standard superframe structure in a conventional GSM communications system.
Figure 2:
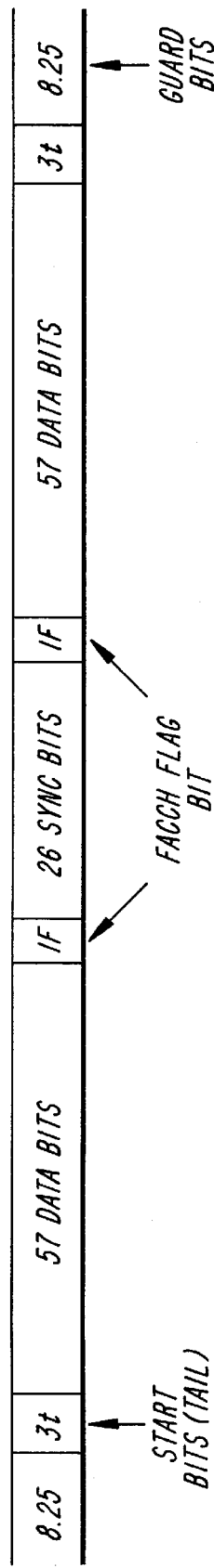
FIG. 2 illustrates the format of a burst in a conventional GSM system.

It will be appreciated by one skilled in the art that the present invention can be used in satellite communication systems as well as land-based radio communication systems or in systems which support both land-based and satellite modes of operation.

According to one embodiment of the present invention, different frames within each transmission burst can be used for the transmission of speech and FACCH messages. For example, speech information can be transmitted using odd numbered frames while FACCH messages can be sent using even numbered frames, or vice versa. This is possible because combining the information from the odd numbered frames will in many cases be sufficient to reconstruct the speech frame. Similarly, the FACCH control message can be reconstructed using the even numbered frames. This method is particularly effective in air interfaces where two modes of operation, such as satellite and terrestrial communication modes, are possible.

An exemplary robust operation mode of a satellite or terrestrial TDMA communication system uses, for example, 16-timeslot TDMA frames with rate ⅓ coding. It will be appreciated that the rate ⅓ code can be separated into two rate ⅔ codes, each in a separate burst. Thus when control information such as a FACCH message is required, the communication data (e.g., speech) can be transmitting using one of the rate ⅔ codes instead of rate ⅓ code, and the FACCH message(s) can be transmitted using the other rate ⅔ code. When the FACCH message is being transmitted, it may be desirable to increase transmission power for disadvantaged users. Because the transmission of even a relatively lengthy FACCH message occurs over a relatively short period of time, such a power increase is provided for a relatively short duration, and does not significantly impact system performance or power requirements.

As described in U.S. patent application Ser. No. 08/501,575 now U.S. Pat. No. 5,663,957 entitled "Dual Mode Satellite/Cellular Terminal," a rate ⅓ code can be partitioned into two rate ⅔ codes. U.S. patent application Ser. No. 08/501,575 now U.S. Pat. No. 5,663,957, is incorporated herein by reference.

The above-described mode of operation can be used in a satellite-based system with satellite diversity to provide improved performance when the signal from each satellite fades independently, such as when the user turns his head and shadows the signal from one satellite but not from the other. Further, since the system in this mode transmits and receives control information with a rate ⅔ code using every 32nd slot when signal quality allows, this mode can be useful in certain non-uniform traffic distributions to increase capacity in a given service area when neighboring service areas are operating below capacity. When neighboring service areas do not need the same frequency channel due to a low traffic demand in those service areas, the carrier-to-interface ratio C/I is improved, allowing rate ⅔ coding and the 32nd timeslot format to effectively double the capacity in a service area with a high traffic demand.

According to one aspect of the invention, the transmission of control information (e.g., FACCH) in a first mode (e.g., every 32nd slot using rate ⅔ coding) or a second mode (e.g., or every 16th slot using rate ⅓ coding) may be selected by the satellite system at any time, even transparently or dynamically (i.e., without forewarning the mobile phone of the mode change). According to the present invention, a mobile unit always receives every 16th slot, and determines whether each 16th slot contains control information intended for the mobile unit, based on unique sync words patterns included in the TDMA bursts by the satellite system. If the 16th slot does not contain control information intended for that particular mobile unit, the mobile unit labels the missing bits as erasures or zero quality values at the input of the error correction decoder. The unique sync words are preferably orthogonal patterns to facilitate discrimination by the mobile units. When conversations with two mobile stations are taking place using the odd and even slots of 16-slot frames, respectively, i.e., each mobile gets a 32nd slot interleaved with the other mobile, each user is silent approximately half the time. During the silence, a FACCH message can be sent to one mobile unit every 16th slot, thus providing double coding protection for at least half the time to both mobile units.

Figure 3:
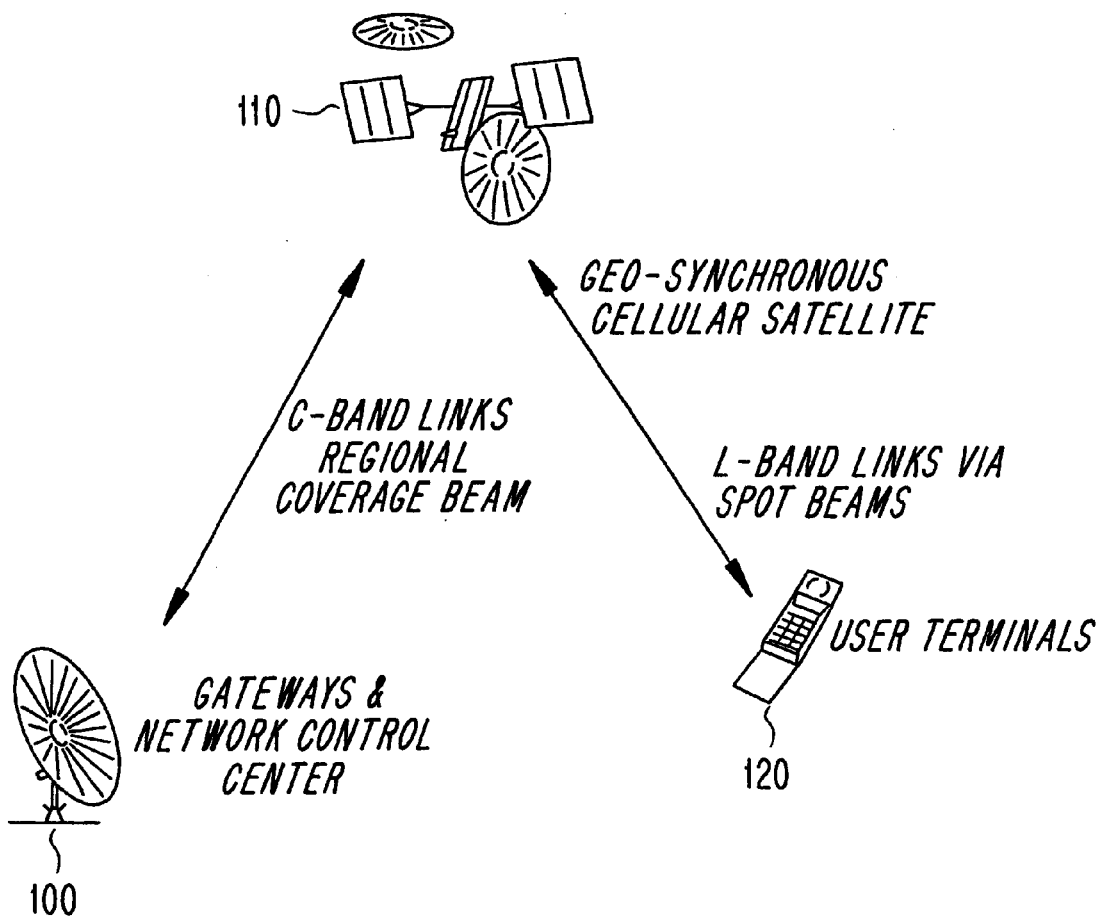
FIG. 3 illustrates a satellite communication system suitable for implementing the method of the present invention.

FIG. 3 illustrates a plurality of mobile radio telephones 120 in communication via satellite 110 with a hub station 100. The hub station is connected, for example, via a local exchange, to the public switch telephone network PSTN to allow calls to be placed between the portable phones and any telephone subscriber worldwide, as well as between the satellite phones.

Figure 4:
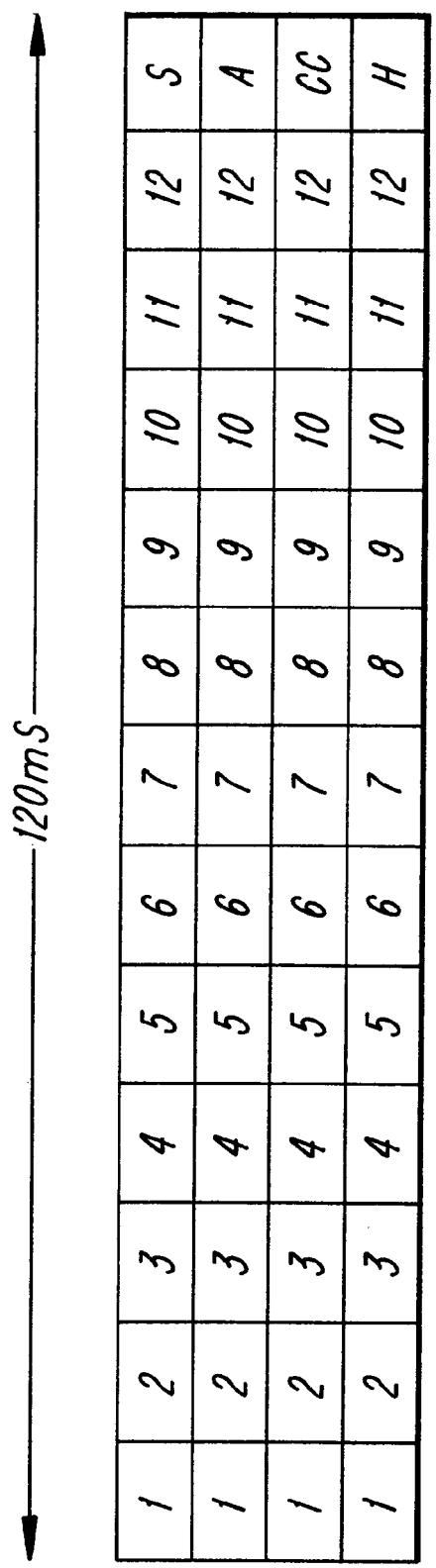
FIG. 4 illustrates a superframe structure for the full-rate satellite mode according to one embodiment of the present invention.

The superframe structure for a "full rate" satellite format is illustrated in FIG. 4. In FIG. 4, the first 12 frames, F1 through F12, contain 16 traffic slots each and the thirteenth frame contains 16 SACCH slots. Each SACCH slot is associated with a corresponding traffic slot. To provide one SACCH per each traffic slot, the SACCH frame is combined with the idle frame to make a 16-slot SACCH frame.

SACCH messages are, as in GSM, interleaved over four successive SACCH frames. As before, 20 milliseconds of speech data may be interleaved using diagonal interleaving but only over four frames. Alternatively, 40 millisecond speech frames may be diagonally interleaved over 8 traffic frames.

According to one embodiment of the present invention, the speech coding rate, the error correction coding, and the slot and superframe structure are the same as the 16-slot structure defined in FIG. 4, except that when a FACCH message is being transmitted, successive frames contain different information (e.g., the even frames contain communication data and the odd frames contain control data).

The GSM standard discloses interleaving "blocks" of speech data (each block representing 20 m speech segments) over eight full-rate frames, using every 8th slot over an 8-frame, 64-slot interval. The speech blocks are diagonally interleaved over this interval with half of a previous block in the first four frames and half of a subsequent block in the second four frames.

In the 16-slot frame format of FIG. 4, the same interleaving period comprises only four of the longer frames, two even frames and two odd frames. Each frame may or may not contain data for the same mobile unit. Therefore, each mobile unit receives both an odd and an even frame slot and the mobile unit determines if the received slot contains data intended for that mobile unit. The slots deemed to contain intended data are demodulated to obtain coded bits. The coded bits are in the form of "soft decisions" that comprise quality information related to the signal to noise ratio of the bit. Bits received corresponding to a slot deemed not to contain information intended for the mobile unit are given a quality or soft value of zero, corresponding to a symbol erasure. Bits having the erasure indication are said to have been "punctured" out, and the subsequent error correction decoding can save resources by ignoring "punctured" or deleted code bits in its decoding process. After deinterleaving, "punctured" bits are dispersed between bits of non-zero quality. Thus, the error correction decoder receives a sufficient number of good bits in any section of coded data to enable proper decoding.

In any speech block, two slots will contain valid data, giving three coded bits per two information bits (six coded bits for four information bits), while half of the other two slots will also contain intended data, giving a further three bits on average representing the same four data bits. Thus, the average coding rate obtained is nine coded bits per four data bits, or better than rate ½ coding. The lowest level of coding obtained is rate ⅔, while the highest level of coding obtained is rate ⅓ when all four successive slots are directed to the same mobile station. The random variation of coding rate between rate ⅔, rate ½, and rate ⅓ from one speech frame to another is not of particular significance, as the perceived speech quality is related to the mean speech block error rate, usually called the frame erasure rate (FER). Correct decoding of a speech block may be verified by including a Cyclic Redundancy Check (CRC) code in the block. Blocks determined with the aid of the CRC code to have been decoded in error are erased. An erased block, representing a 20 ms segment of the speech waveform, is prevented from causing an annoying click or noise burst in the earphone by replacing it with a previously received correct segment. This technique of "bad frame replacement" is disclosed in U.S. Pat. No. 4,532,636, which is incorporated herein by reference.

Figure 5:
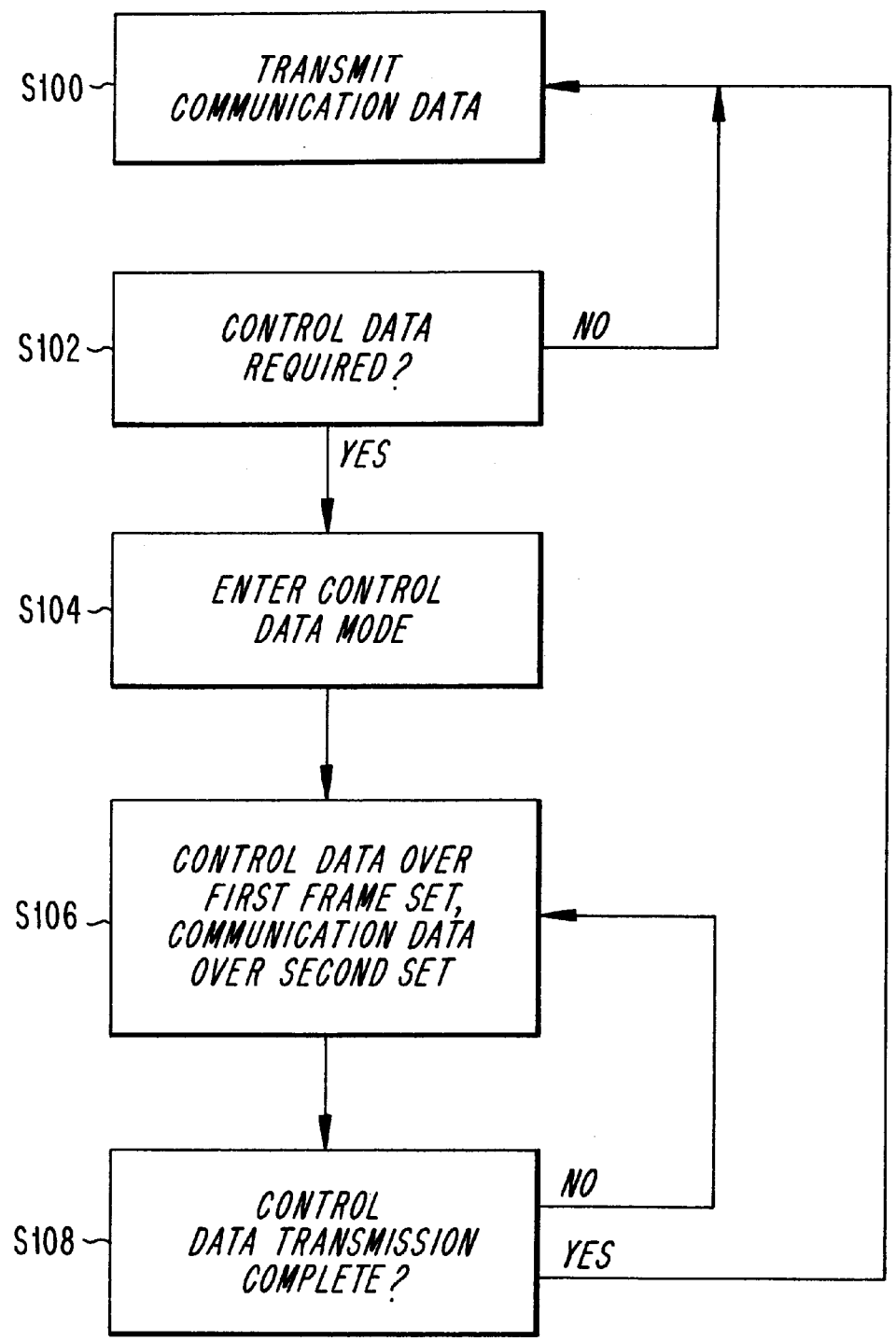
FIG. 5 is a flow chart describing a method for transmitting data and FACCH messages within a communication system according to one embodiment of the present invention.

FIG. 5 is a flow chart illustrating the operation of one embodiment of the present invention. The communication system (base station, mobile switching center, satellite, etc. . . . ) first transmits to a particular mobile unit in a conventional manner in step S100. The system operation is not affected by the method of the present invention until control data needs to be transmitted to the mobile unit. Thus, the system determines whether control data needs to be sent to the mobile unit in step S102. If no control data needs to be sent, the process returns to step S100. If control data needs to be transmitted to the mobile unit, the system enters a control data mode in step S104. In step S106, the system transmits control data to the mobile station using a first set (e.g., the odd-numbered ones) of TDMA frames within the transmission burst, and transmits the communication data on a second set (e.g., the even numbered ones) of TDMA frames. As discussed above, the level of coding protection in the control data mode is preferably less than the level of coding protection in Step S100. After the control data transmission is completed in step S108, the process returns to step S100, and the system transmits communication data in the conventional manner.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

What is claimed is:

1. A method for transmitting control data and communication data between a control station and a transmitter/receiver in a communication system, comprising the steps of:

transmitting communication data over a plurality of frames in a first mode using a first level of coding protection; and in a second mode, dividing the plurality of frames into first and second frame sets, transmitting communication data using a second level of coding protection over the first frame set, and transmitting the control data over the second frame set.

2. The method of claim 1, wherein the first frame set includes even-numbered ones of the plurality of frames and the second frame set includes odd-numbered ones of the plurality of frames.

3. The method of claim 1, wherein the first frame set includes odd-numbered ones of the plurality of frames and the second frame set includes even-numbered ones of the plurality of frames.

4. The method of claim 1, wherein the second level of coding protection is lower than the first level of coding protection.

5. The method of claim 1, wherein the control data is transmitted using the second level of coding protection.

6. The method of claim 1, wherein the first level of coding protection is rate ⅓ coding and the second level of coding protection is rate ⅔ coding.

7. The method of claim 1, wherein the control station is a satellite, and the transmitter/receiver is a mobile telephone unit.

8. The method of claim 1, wherein the control data is FACCH information.

9. The method of claim 1, wherein the communication system is a GSM system.

10. A method for transmitting control data and communication data between a control station and a transmitter/receiver in a communication system, comprising the steps of:

transmitting communication data over a plurality of frames, at a first transmission power level in a first mode; and in a second mode, dividing the plurality of frames into first and second frame sets, transmitting communication data at a second transmission power level over the first frame set, and transmitting the control data over the second frame set.

11. The method of claim 10, wherein the second transmission power level is higher than the first transmission power level.

12. A communication system for transmitting control data and communication data between a control station and a first transmitter/receiver, comprising:

first mode means for transmitting communication data over a plurality of frames using a first level of coding protection in a first mode; and second mode means for, in a second mode, dividing the plurality of frames into first and second frame sets, transmitting communication data over the first frame set using a second level of coding protection, and transmitting the control data over the second frame set.

13. The system of claim 12, wherein the first frame set includes even-numbered ones of the plurality of frames and the second frame set includes odd-numbered ones of the plurality of frames.

14. The system of claim 12, wherein the first frame set includes odd-numbered ones of the plurality of frames and the second frame set includes even-numbered ones of the plurality of frames.

15. The system of claim 12, wherein the second level of coding protection is lower than the first level of coding protection.

16. The system of claim 12 wherein the control data is transmitted using the second level of coding protection.

17. The system of claim 12, wherein the first level of coding protection is rate $\frac{1}{3}$ coding and the second level of coding protection is rate $\frac{2}{3}$ coding.

18. The system of claim 12, wherein the control station is a satellite, and the first transmitter/receiver is a mobile telephone unit.

19. The system of claim 12, wherein the control data is FACCH information.

20. The system of claim 12, wherein the communication system is a GSM system.

21. The system of claim 12, further comprising transparent selection means for selecting between the first mode means and the second mode means transparently to the transmitter/receiver.

22. The system of claim 21, wherein the transparent selection means embeds unique synchronization words into a signal to indicate whether the signal is intended for the first transmitter/receiver or a second transmitter/receiver.

23. A communication system for transmitting control data and communication data between a control station and a first transmitter/receiver, comprising:

first mode means for transmitting communication data in a first mode over a plurality of frames at a first transmission power level; and second mode means for, in a second mode, dividing the plurality of frames into first and second frame sets, transmitting communication data over the first frame set at second transmission power level, and transmitting the control data over the second frame set.

24. The system of claim 23, wherein the second transmission power level is higher than the first transmission power level.

* * * * *